Sept. 25, 1934.    L. HOTTO    1,974,869
HARROW
Filed March 5, 1934    3 Sheets-Sheet 1

Inventor
*Louis Hotto*

By *Geo. F. Kimmel*
Attorney

Sept. 25, 1934. L. HOTTO 1,974,869
HARROW
Filed March 5, 1934 3 Sheets-Sheet 2
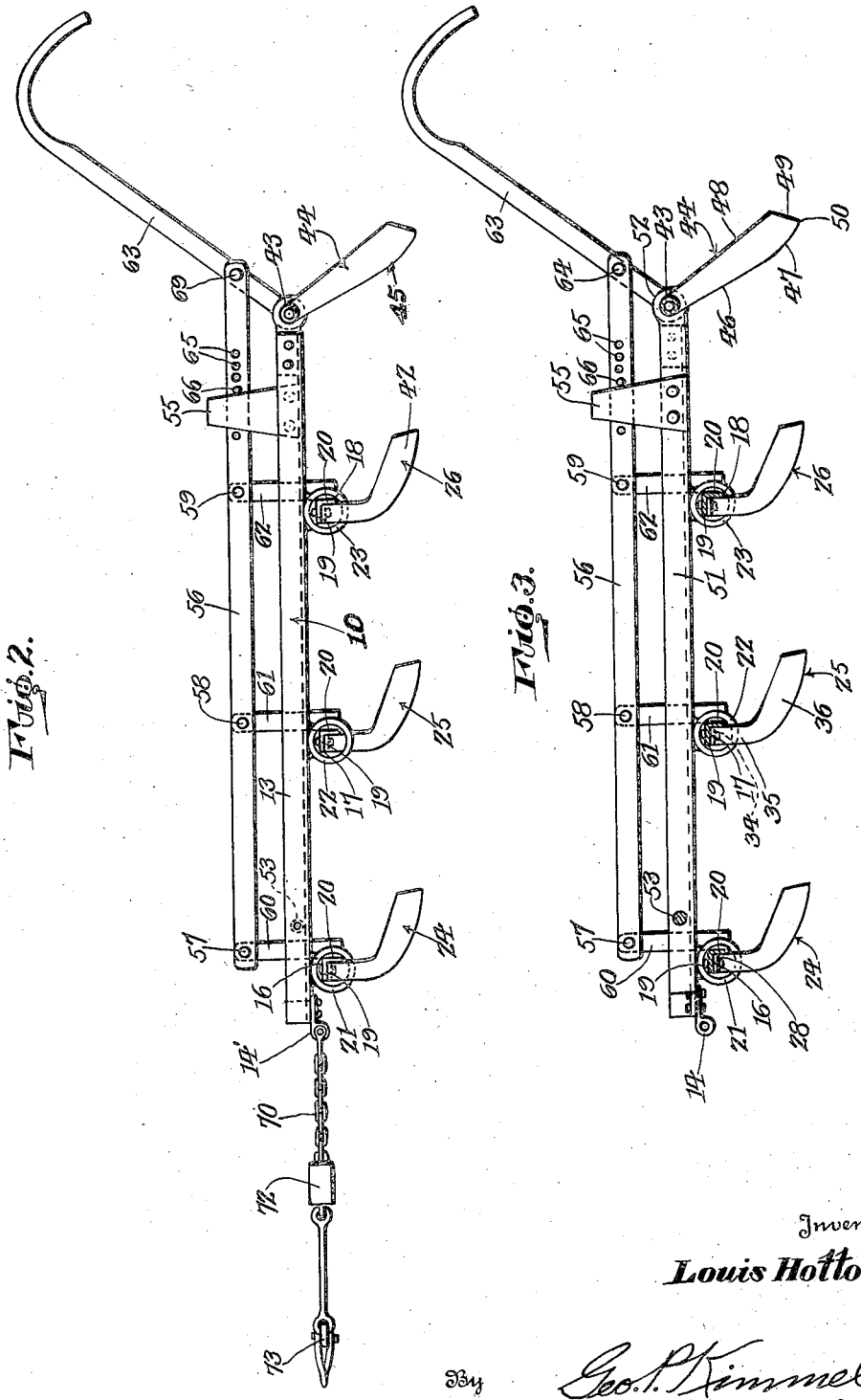

Sept. 25, 1934.  L. HOTTO  1,974,869
HARROW
Filed March 5, 1934  3 Sheets-Sheet 3
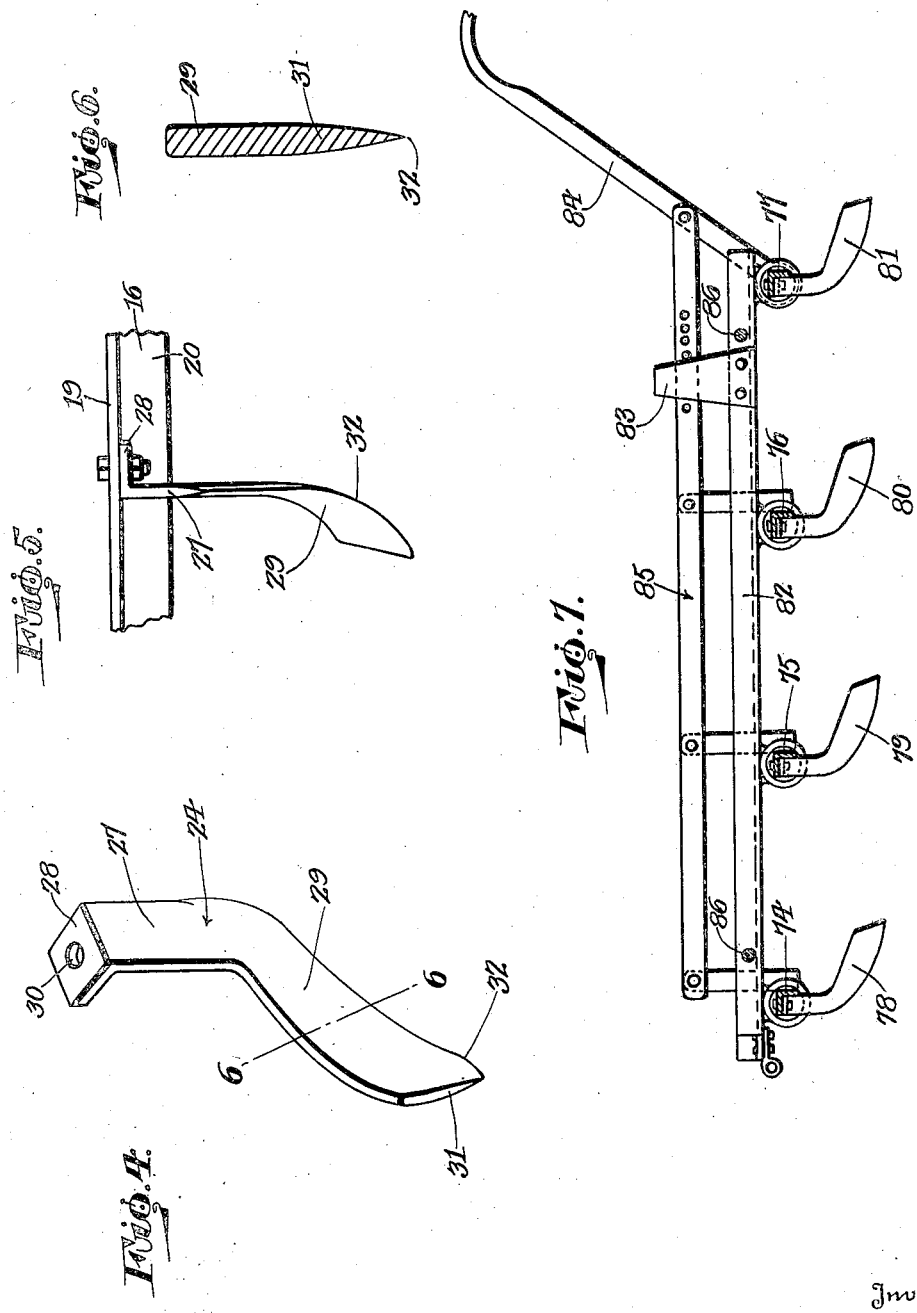

Patented Sept. 25, 1934

1,974,869

UNITED STATES PATENT OFFICE 1,974,869

HARROW

Louis Hotto, East Carondelet, Ill.

Application March 5, 1934, Serial No. 714,164

7 Claims. (Cl. 55—105)

This invention relates to a harrow and has for its object to provide, a ground working device of the class referred to, in a manner as hereinafter set forth with means for shifting the soil in opposite directions transversely with respect to the draft line of the harrow during the dragging of the latter for ground harrowing or pulverizing purposes.

A further object of the invention is to provide, in a manner as hereinafter set forth, a harrow having depending teeth capable of being elevated and lowered for the purpose of gaging their depth with respect to the ground level when harrowing the soil.

A further object of the invention is to provide, in a manner as hereinafter set forth, a harrow including parallel spaced sets of spaced teeth-carrying bars, and means whereby each set of bars may be independently adjusted to gage the depth of the teeth carried thereby with respect to the soil to be acted upon and further detachably maintained in adjusted position.

A further object of the invention is to provide, in a manner as hereinafter set forth, a harrow including revolubly mounted teeth-carrying bars, and means for revolving the bars to varying the position of the teeth with respect to the soil to be acted upon.

A further object of the invention is to provide, in a manner as hereinafter set forth, a harrow including adjustable teeth-carrying bars and teeth depending from and acting upon the soil rearwardly of each bar.

A further object of the invention is to provide, in a manner as hereinafter set forth a harrow having tandem-wise arranged sets of series of teeth, and with the teeth of each series formed and supported in a manner to be offered small resistance from the soil when acting upon the latter.

Further objects of the invention are to provide, in a manner as hereinafter set forth, a harrow which is comparatively simple in its construction, strong, durable, compact, adjustable, readily assembled, thoroughly efficient in its use, formed of a pair of freely pivoting sections, and comparatively inexpensive to manufacture.

To the above ends essentially and to others which may hereinafter appear, the invention consists of such parts and such combination of parts which fall within the scope of the invention as claimed.

In the drawings:

Figure 2 is a side elevation thereof.

Figure 3 is a section on line 3—3, Figure 1.

Figure 4 is a perspective view of the type of tooth of one series.

Figure 5 is a view looking towards the front of the tooth shown in Figure 4.

Figure 6 is a section on line 6—6, Figure 4.

Figure 7 is a longitudinal sectional view of a modified form of harrow in accordance with this invention.

Figure 1:
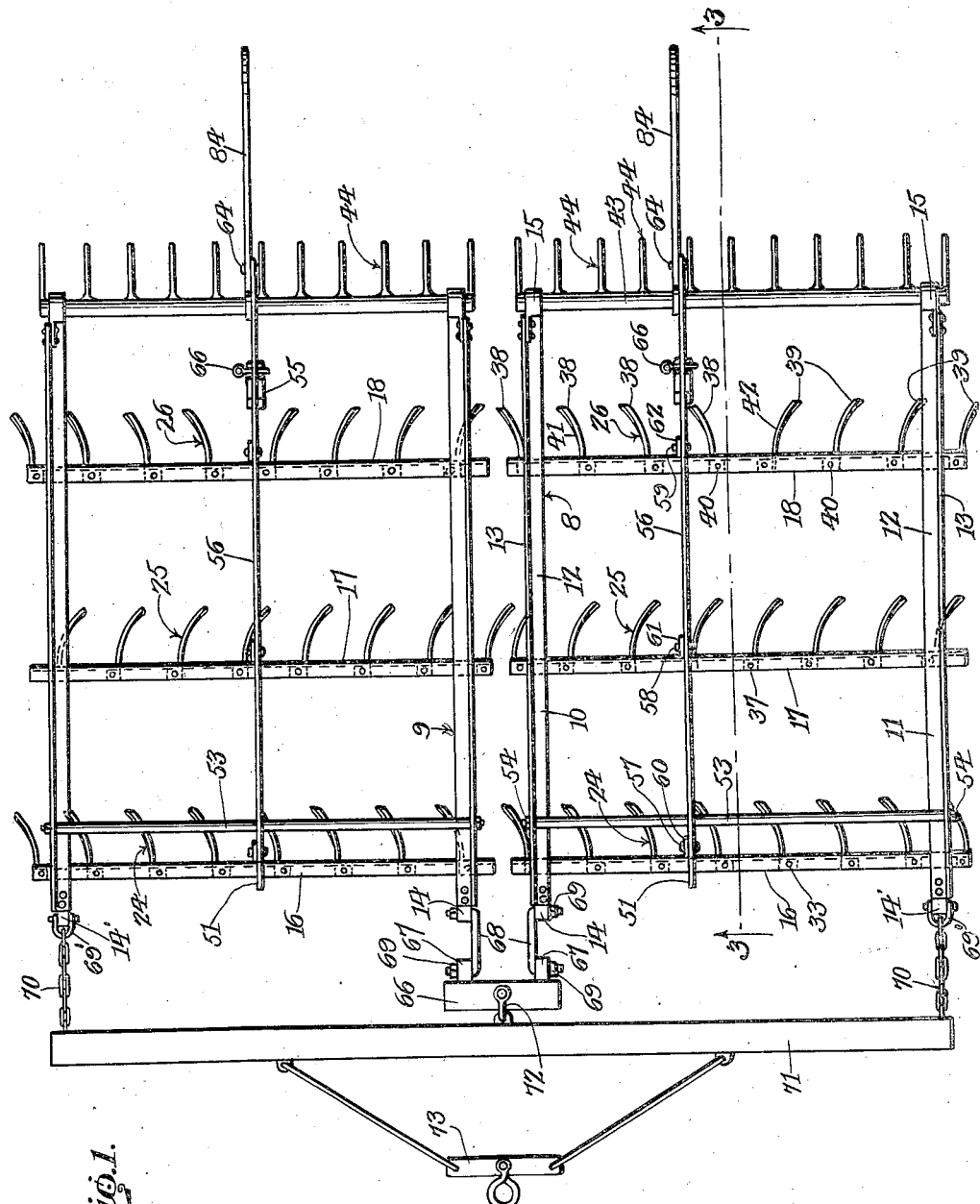
Figure 1 is a top plan view of the harrow.

With reference to Figures 1 to 3. The harrow includes a pair of spaced parallel teeth-carrying sections 8, 9 freely pivoting at their forward ends to provide for unevenness of the soil. As the sections 8, 9 are of like construction, but one will be described, as the description of one will apply to the other. Each of said sections consists of an inner and an outer side rail 10, 11 respectively. The rails 10, 11 are oppositely disposed and each includes a lower horizontal flange 12 and an outer vertically disposed flange 13 extending upwardly from the outer side of flange 12. Secured to the flanges 12, extending forwardly therefrom and disposed transversely with respect thereto are aligning tubular members 14, 14'. Secured to the inner faces of the flanges 13 and extending rearwardly therefrom, as well as being disposed transversely with respect to the flanges 12 are aligning tubular members 15.

Positioned below the lower face of flanges 12, as well as extending laterally therefrom are spaced parallel revoluble teeth-carrying bars 16, 17 and 18 which are spaced from the forward and rear ends of the rails 10, 11. Each tooth carrying bar (Figures 2 and 3) comprises an upper flatwise disposed flange 19 and a vertically disposed flange 20 depending from the rear side of flange 19. Suspending rings 21, 22 and 23 are integral with and depend from the flange 12 of each side rail. The rings depending from the side rail 10 align with the rings depending from the side rail 11. The bar 16 is revolubly mounted in aligning rings 21 and extends therefrom. The bar 17 is revolubly mounted in aligning rings 22 and extends therefrom. The bar 18 is revolubly mounted in aligning rings 23 and extends therefrom. Carried by the bar 16 is a series of teeth 24. Carried by the bar 17 is a series of teeth 25 and carried by the bar 18 is a series of teeth 26. The teeth 24, 25 and 26 extend rearwardly with respect to the bars 16, 17 and 18 respectively. The teeth 25 are staggeredly arranged with respect to teeth 24. The teeth 26 are staggeredly arranged with respect to teeth 25. Each tooth (Figures 4, 5 and 6) of the series of teeth 24 consists of a vertical stem part 27, a squared head part 28 and a ground working part 29. The part 28 is disposed at right angles to the upper end of part 27 and is formed with an opening 30. The part 27 at its upper end merges into the inner side of part 28. The part 29 extends rearwardly with respect to and merges at its forward end into the lower end of part 27. The part 29 is of greater length than part 27 and curves throughout in a direction away from the rails 10, 11, that is, towards the right. The part 29 inclines downwardly from part 27, and has its lower portion 31 (Figure 6) gradually decreasing in thickness to provide a sharp bottom edge 32. The latter is curved. The teeth 24 when secured to the bar 16 are arranged in equi-distant spaced relation. The head parts 28 are positioned against the lower face of flange 19 of bar 16. The stem parts 27 have a portion of their rear side edges abut the forward face of flange 20 of bar 16. Holdfast devices 33 extend through the openings 30 of the head parts 29 and the flange 19 of bar 16 for anchoring the teeth 24 in position.

Each tooth of the series of teeth 25 includes an apertured head part 34, a vertical stem part 35 and a curved ground working part 36. The teeth 25 are constructed similar to the teeth 24, with the exceptions that the stem part 35 at its upper end merges into the outer side of the head part 34 and the part 36 extends in a direction towards the rails 10 and 11, that is to say to the left. Holdfast devices 37 are employed for anchoring the head parts 34 of teeth 25 to the flange 19 of bar 17. The stem parts 35 of teeth 25 have their rear side edges abut the forward face of flange 20 of bar 17.

The teeth, indicated at 38 of the series of teeth 26 are constructed similar to the teeth 24. The teeth, indicated at 39 of the series of teeth 26 are constructed similar to the teeth 25. The teeth 38 are arranged relatively to bar 18 in the same manner as the teeth 24 are arranged with respect to bar 16. The teeth 39 are arranged relatively to bar 18 in the same manner as the teeth 25 are arranged with respect to bar 17. Holdfast devices 40 are employed for anchoring the teeth 38 and 39 to bar 18. The ground working parts 41 of the teeth 38 are curved in a direction towards the side rail 10, that is to the right. The ground working parts 42 of the teeth 38 are curved in a direction towards side rail 11, that is to the left.

Revolubly mounted in the members 15, as well as projecting laterally therefrom is a tubular tooth carrying bar 43 having formed integral therewith a series of downwardly disposed rearwardly inclined spaced teeth 44 of greater length than that of the teeth 24, 25 and 26. The teeth 44 are staggeredly arranged with respect to the teeth 26. Each tooth 44 (Figure 3) consists of a body part 45 increasing in width towards its outer end, having its forward edge formed of an inclined stretch 46 and a rearwardly curved stretch 47, its rear edge 48 inclining rearwardly, its bottom edge 49, inclining forwardly from the outer end of edge 48 to the outer end of stretch 47 to provide a point 50.

Mounted over the bars 16, 17 and 18 is an oblong bar 51 standing on its lower lengthwise edge and which has an enlarged apertured rear end 52 for the passage of the tubular bar 44. Extending through the rails 10, 11 and bar 51 is a supporting member 53 for bar 51. The member 53 is connected to rails 10, 11, as at 54 and arranged rearwardly of and in proximity to bar 16. Secured to opposite sides of bar 51, between bars 17 and 43 are upstanding parallel spaced combined guide and holder members 55 of tapered form.

The section 8, as well as section 9 is provided with an adjusting mechanism for and which is common to the teeth-carrying bars 16, 17, 18 and 44 of the section. The said mechanism consists of a pull member 56 arranged over the bar 51. Pivotally connected as at 57, 58, 59 to the member 56 are the upper ends of depending links 60, 61 and 62 respectively which are anchored at their lower ends to the rear faces of the flanges 20 of the bars 16, 17 and 18 respectively. Fixed to the bar 43 is the lower end of an upstanding rearwardly inclined lever arm 63. The member 56 at its rear end is pivotally connected, as at 64 to the lever arm 63. The member 56 in proximity to its rear end is formed with a row of spaced openings 65 for selectively receiving a stop pin 66 (Figure 1) which coacts with the rear edges of the members 55 for retaining the adjusting mechanism in its adjusted position. On the forward and rearward movements of lever arm 63 the several series of teeth are simultaneously lowered and elevated respectively.

The rails 10, 11, bar 43 and member 53 of each section provide the latter in the form of an open front and a closed rear frame, and said frames are coupled together at the forward ends of their inner sides. The coupling of the frames at their inner sides is provided by an oblong head piece 66 having extended from its rear face a pair of spaced aligning tubular members 67 which also align with the tubular members 14 on the forward ends of the rails 10. Each member 67 is pivotally connected to a member 14 by a yoke 68. The yokes are oppositely disposed and carry at their ends, as at 69 retaining means therefor. The frames are also coupled together at the forward ends of their outer sides and for such purpose a yoke 69' is pivotally attached to each member 14'. Attached to the yokes 69' are forwardly extending chains 70 which are secured to the ends of a draft bar 71 which is common to the two frames. The head piece 66 is pivotally connected, as at 72 to the draft bar 71 centrally of the latter. The arrangement referred to permits of the frames freely pivoting at their forward ends. A hitch 73 is extended forwardly from the draft bar 71.

In the modified form shown by Figure 7 four tooth carrying bars of like form are employed, and which are indicated at 74, 75, 76 and 77. These bars are of the same form as the bars 16, 17 and 18. Spaced teeth 78, 79, 80 and 81 are anchored to bars 74, 75, 76 and 77 respectively. The teeth 78 and 80 are of the same form as the teeth 24. The teeth 79 and 81 are of the same form as the teeth 25. The teeth 78 and 80 are curved to the right and the teeth 79 and 81 curved to the left. The bars 74, 75, 76 and 77 are revolubly supported in the same manner as the bars 16, 17 and 18. The bar 82 which provides a support for the combined guide and holder members 83 is of a different form from that of bar 51. The bar 82 is connected to the lever 84 of the adjusting mechanism 85. The lever 84 is fixed at its lower end to bar 77. The bar 82 is mounted upon a pair of supports 86 which are to be anchored to the side rails 10, 11 in the same manner as bar 51. Otherwise than that as stated, the form shown in Figure 7 would be similar to that shown in Figure 1.

What I claim is:

1. A harrow formed of a pair of spaced parallel frame-like sections, a head piece, a pair of oppositely disposed spaced yokes pivotally connected to said head piece and to the forward ends of the inner sides of said sections, said head piece and yokes providing a pivotal means for connecting the forward ends of the inner sides of said sections together, draft means pivotally connected intermediate its ends to said head piece and loosely and pivotally connected at its ends to the forward ends of the outer sides of said sections, each of said sections being provided with spaced revolubly supported adjustable bars, a series of teeth depending from and extending rearwardly from each bar, and means connected to said bars for adjusting them in unison to elevate and to lower said teeth simultaneously.

2. In a harrow, spaced revolubly supported adjustable bars arranged tandem-wise, a series of teeth depending from each bar and each formed with a vertically disposed portion having extended from its lower end a curved inclined rearwardly extending ground working part, each of said working parts having a pointed and curved working edge, the curved working parts of the teeth carried by a leading bar extending to the right and the curved working parts of the teeth carried by a follower bar immediately adjacent the leading bar extending to the left.

3. In a harrow, a bodily adjustable set of spaced teeth, a revolubly mounted bar having a horizontal flange and a vertical flange depending from the rear side of the horizontal flange, each of said teeth formed with a head part anchored to the lower face of the horizontal flange, a depending stem integral with one side of said head and having its rear edge abutting the forward face of said vertical flange and a rearwardly extending curved ground working part disposed diagonally with respect to the line of draft.

4. In a harrow, a bodily adjustable set of spaced teeth, a revolubly mounted bar having a horizontal flange and a vertical flange depending from the rear side of the horizontal flange, each of said teeth formed with a head part anchored to the lower face of the horizontal flange, a depending stem integral with one side of said head and having its rear edge abutting the forward face of said vertical flange and a rearwardly extending curved ground working part disposed diagonally with respect to the line of draft, said ground working part disposed at an angle to said stem and having a curved and pointed bottom edge.

5. In a harrow, a pair of spaced parallel side rails, a rear bar revolubly supported at the rear end of said rails and carrying depending spaced teeth, a set of forward spaced angle-shaped tooth carrying bars arranged below said rails and each consisting of a horizontal flange and a vertical flange depending from the rear of said other flange, means depending from said rails for revolubly supporting the bars of said set, a series of spaced teeth anchored to the horizontal flange and opposing the vertical flange of each of said forward bars, and means for adjusting said bars simultaneously for elevating and lowering the teeth, said adjusting means including a lever fixed to said rear bar, a series of spaced links fixed to the vertical flanges of the said forward bars of said set and a pull member pivotally connected to the links and to said lever.

6. In a harrow, a pair of spaced parallel side rails, a series of spaced parallel tooth-carrying bars disposed below and transversely of said rails, each of said bars being formed of a horizontal flange and a vertical flange depending from the horizontal flange, means depending from rails for revolubly supporting said bars, a series of spaced depending teeth anchored to the horizontal flange and opposing the vertical flange of each of said bars, a pull member arranged over said bars, a set of depending spaced links pivotally connected to said member and fixed to the vertical flanges of the forward bars of said series, and an oscillatory lever fixed at its lower end to the rearmost bar of said series and pivotally connected in proximity to said lower end to the rear end of said member whereby on the operation of the lever said member and links will cooperate therewith for revolving the bars in directions to elevate and lower the teeth.

7. In a harrow, a pair of spaced parallel side rails, a series of revoluble spaced parallel teeth-carrying bars arranged below and disposed transversely of said rails, each of said bars formed of a horizontal flange and a vertical flange depending from the rear side of the horizontal flange, means depending from said side rails for revolubly supporting said bars at the ends of the latter, a series of teeth depending from each bar and having the upper portion thereof abutting the forward face of the vertical flange of the bar, and means for anchoring the upper ends of the teeth of a series against the lower face of a horizontal flange of a bar.

LOUIS HOTTO.